Nov. 3, 1931.  A. A. OSWALD ET AL  1,830,210

ELECTRIC DISCHARGE APPARATUS

Filed June 13, 1923   4 Sheets-Sheet 1

Fig. 1

Inventors:
Arthur A. Oswald.
John C. Schelleng
by E. W. Griggs   Att'y

Fig. 2

Inventors:
Arthur A. Oswald.
John C. Schelleng.
by E W Griggs Att'y

Fig. 3.

Patented Nov. 3, 1931

1,830,210

UNITED STATES PATENT OFFICE

ARTHUR A. OSWALD AND JOHN C. SCHELLENG, OF EAST ORANGE, NEW JERSEY, ASSIGNORS TO WESTERN ELECTRIC COMPANY, INCORPORATED, OF NEW YORK, N. Y., A CORPORATION OF NEW YORK

ELECTRIC DISCHARGE APPARATUS

Application filed June 13, 1923. Serial No. 645,027.

This invention relates to prevention of undesired oscillations in an electric system including parallel connected electric discharge devices. It is particularly applicable to carrier wave signaling system in which three electrode discharge devices are used to supply carrier waves or impulses of high power and high voltage to a transmitting circuit.

As is well known, when electric discharge devices, each comprising a closed vessel having an electronic cathode, an anode and control electrode or grid, are connected in parallel to supply energy to a load circuit, there is a tendency toward the production of free oscillations in the system comprising the devices and their associated circuits. These oscillations are especially undesirable in cases where the system is to be used to faithfully reproduce high frequency waves impressed on the input circuit of the devices, as in carrier signaling systems; since, among other disadvantages, their production often prevents the system from operating at the desired frequency, causes distortion of the form of the wave to be repeated, wastes energy by diverting it from a useful purpose thereby reducing the efficiency of the system and causes series overheating of the circuit conductors and lead-in wires for the electrodes of the discharge devices, whereby the devices are liable to be destroyed.

It is now more or less generally accepted that the production of undesired or parasitic oscillations is due to the cyclic transfer of energy from the output circuits of the devices to their input circuits, the amplitude and phase of this energy relatively to that traversing the output circuits being such as to set up and maintain a current flowing in the system, the frequency of which is determined by the inherent reactances of the system. The inherent reactances of a system of this kind may be defined as consisting of the small inductances of the leads connecting their grids, the small inductances of the leads connecting their plates, and the internal grid-filament, grid-plate and filament-plate capacities of the parallel connected devices, as well as the different inductances and capacities of the conductors interconnecting the devices and the conductors associated with their input and output circuits.

Where a number of such devices are connected in parallel, the inherent reactances individual to each device combine to produce a network having several degrees of freedom with the result that a number of oscillating currents of different frequencies are caused to flow in the system. In sets of the type described above, which include electric discharge devices each adapted to deliver energy of at least several kilowatts to a load circuit and each having a direct current potential of several thousand volts supplied to its plate, which will be hereinafter referred to as high-power-high-voltage devices, it has been found that the well-known expedients heretofore employed do not effectively prevent the generation of undesired or parasitic oscillations. One reason for this resides in the fact that the design of discharge devices necessary for these high voltages and high powers involves a departure from previous construction which materially changes the internal characteristics of these devices for high frequency current and hence the internal impedance conditions are radically different from those heretofore encountered and the change is of an order to promote the production of parasitic oscillations. With ten high power-high potential devices connected in parallel each adapted to supply 10 kilowatts to a load circuit, the total energy delivered to the load circuit will be upward of 100 kilowatts and the energy flowing through the circuits of the system will be considerably greater. It will, therefore, be appreciated that the conditions tending to produce undesired oscillations in a 100 kilowatt installation, are entirely different from those which obtain in the relatively low-power-low-voltage systems previously used, in which the maximum power delivered to the load circuit was of the order of 1 kilowatt.

It is possible that in the earlier low power systems certain parasitic impulses, which the preventive means employed with these systems were not designed to suppress, were of negligible amplitude; whereas in the very high power systems now used, the amplitude of these impulses is sufficient to maintain the flow of oscillating current. Again, with the high voltage utilized in the present systems compared with the relatively low voltage used in the earlier systems, the potential differences across the oscillating circuit constituted by the inherent reactances individual to a single device, as well as that across the complex oscillating circuits consisting of various portions thereof and the whole system, is of sufficient magnitude to maintain the flow of oscillating currents through the suppression means used in the low power systems.

Whatever the nature or cause of these undesired oscillations, their presence, for the reasons given above, is detrimental to the proper operation of the system.

The present invention provides an arrangement adapted to be associated with a system comprising a number of parallel connected high-power-high-potential electric discharge devices, which effectively prevents the production of undesired oscillations.

According to this invention, an arrangement is provided comprising resistances and reactances adapted to be associated with a system including a number of three electrode electric discharge devices having their electrodes connected in parallel, constituting in effect an impedance network which provides a plurality of paths, one of which is of low impedance for the high frequency energy which it is desired to reproduce but offers high impedance to current impulses of undesired frequencies, while the other path is of relatively low impedance for oscillations of undesired frequencies and includes means for suppressing or dissipating them, or, at least, for so reducing their amplitudes that they are insufficient to maintain the flow of oscillating currents of the undesired frequencies.

One object of this invention is to provide for the suppression of parasitic oscillations in a system which includes high power high potential electric discharge devices.

Another object is to provide for the diversion of impulses of undesired frequencies through a path associated with a system comprising a number of interconnected electric discharge devices which includes means for dissipating their energy.

Still another object is to provide an arrangement having a path for currents of desired frequency across which a high potential is impressed and a path for undesired oscillations including energy dissipating means across which is impressed a voltage that is insufficient to maintain the flow of these undesired oscillations.

The novel features and combinations which are believed to be characteristic of this invention will be set forth with particularity in the appended claims. The invention itself, however, both as to its organization and method of operation, together with additional objects and advantages thereof, will be best understood by reference to the following description taken in connection with the accompanying drawings in which

The invention will be hereinafter disclosed as applied to a radio signaling system in which the electric discharge devices are employed to amplify high frequency carrier waves which may be used either for radio telegraphy or radio telephony.

Figure 1:
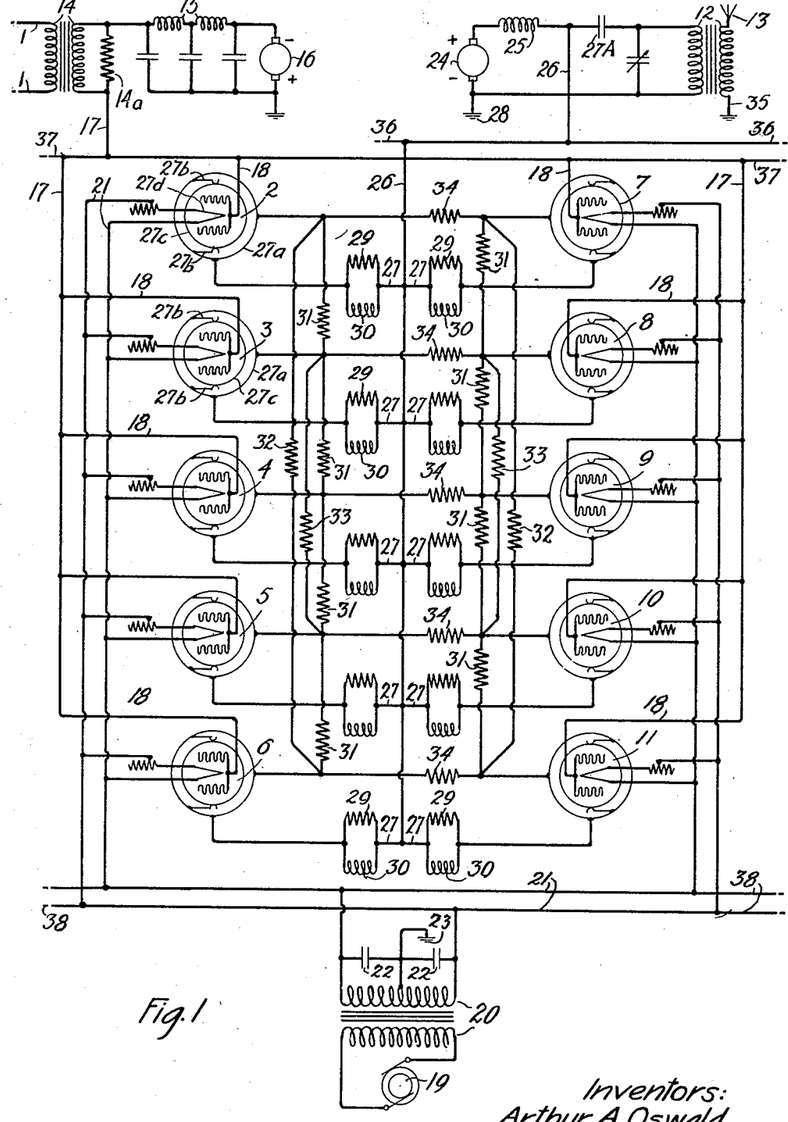
Fig. 1 is a simplified circuit diagram of an electric discharge system having the invention embodied in the output circuits of the tubes.

Referring now to Fig. 1, there is shown a radio transmitter in which the high frequency waves are supplied through a circuit 1 and are impressed upon the common input circuit of ten parallel connected high-power-high-potential amplifiers 2 to 11 inclusive, to supply the high frequency waves in amplified form through a transformer 12, provided with a metallic core, the secondary of which is included in an antenna circuit 13. As shown in this figure, the circuit 1 is coupled to the common input circuit of the amplifiers by the transformer 14 having one terminal of its secondary connected through a filter 15 with a polarizing source 16, the opposite terminal of this winding being connected by a conductor 17 and leads 18 to each of the grid or control electrodes of the amplifiers. Connected in parallel with the secondary winding of the transformer 14 is a resistance 14a which is of such order of magnitude relatively to the internal input impedance of the discharge devices, that these devices are caused to faithfully repeat the high frequency current impressed upon their common input circuit substantially without distortion. The source 16 serves to impress a polarizing potential upon the grid electrodes of the amplifiers, while the filter 15 is adapted to suppress the voltage variations of the source 16 such as, for example, commutator ripples, whereby a constant polarizing potential will be supplied to the control electrodes of the amplifiers. Alternating current from the source 19 to heat the filaments is transmitted through the transformer 20 to the filament circuit 21 across which the filaments of the amplifiers are connected in parallel. Connected across the secondary winding of the transformer 20 are a pair of condensers 22, the adjacent plates of which are connected together and to the midpoint of the secondary winding by a common lead which is connected to ground at 23, whereby the high frequency waves are prevented from traversing the winding 20. Space current is supplied to the plates or anodes of the amplifiers by a source 24 through the following circuit: from the positive terminal of the source 24, choke coil 25, conductor 26, leads 27 to the water jackets 27a, contacts 27b, the plates or anodes of the amplifiers 27c, cathodes 27d, conductors 21, secondary of the transformer 20, ground 23, and thence through ground 28 to the negative terminal of the source 24. The conductor 26 is connected through a blocking condenser 27A to the primary winding of the transformer 12 having a variable condenser connected across it to constitute a circuit tuned to the frequency of the waves to be transmitted. The tuned circuit is grounded at 28.

Included in each of the leads 27 connecting the anode of one amplifier to the common conductor 26 is a reactive device having parallel paths, one of which comprises a resistance 29 and the other an inductance 30. The resistance 29 offers high impedance to the flow of high frequency currents of all frequencies, while the inductance 30 provides a low impedance path for the high frequency waves to be amplified. The resistance 29 and inductance 30 together offer resistive impedance to the flow of undesired high frequency current while inductance 30 provides a low impedance path for the high frequency waves to be amplified. The combination of the two in each plate circuit tends to reduce singing. Their effect is two-fold, first to reduce the frequency at which singing tends to take place, this has the effect to reducing the tendency of the circuit to sing, and second, to increase the damping to a point at which oscillations will not be supported.

This figure serves to diagrammatically illustrate the arrangement and relative positions of ten amplifiers as they are assembled on a rack or frame to constitute a bank. The amplifiers are shown as arranged in two rows with the amplifiers in the two rows opposite each other in the same transverse plane. By this method of mounting, it is possible to reduce the length of the leads connecting the respective electrodes to the common bus bar and hence to reduce the inductances of these leads to a minimum. As stated above, these inductances are a factor in determining the inherent reactances of the system.

Interconnecting the anodes of the adjacent amplifiers in each row is a path including a resistance 31. Interconnecting the anodes of the amplifiers 2 and 6 and also the anodes of the amplifiers 7 and 11 are conductive paths each including a resistance 32. Interconnecting the anodes of the amplifiers 3 and 5 and the anodes of the amplifiers 8 and 10 are conductive paths each including a resistance 33. Connecting the anodes of the amplifiers 2 and 7, 3 and 8, 4 and 9, 5 and 10, 6 and 11 are conductive paths each including a resistance 34. Each of these resistances 31, 32, 33 and 34 is of the order of 100 ohms and hence is adapted to provide a relatively low impedance path for oscillating currents of high frequencies. The terminals of these paths are connected to electrodes supplied from the source 24, so that there is no difference of potential impressed upon them except that due to differences in the impedances of the leads connecting the respective electrodes to the common bus bar 26. However, the leads 27 and included impedance devices 29—30 are carefully designed to impose equal impedances to the flow of the current to be amplified and hence any inequalities in the potential drop across the respective leads due to the flow of the amplified current will be caused by differences in the physical characteristics of the wire used for this purpose. Since it is possible to secure conductors having identical characteristics, it will be apparent that leads 27 of equal impedances can be provided and, as a result, that the same potential will be impressed upon the electrodes of the discharge devices connected by the low impedance paths including the resistances 31 to 34.

The operation of this system may be described as follows: Carrier waves supplied by the source 1 are impressed upon the input circuits of the parallel connected amplifiers by the transformer 14 and serve to control the flow of current in the space between the filaments and anodes of the amplifiers. Space current will flow from one terminal of the source 24, through the choke coil 25, conductor 26, leads 27, water jackets 27a, contacts 27b, to the anodes 27c, across the space between the anodes and filaments of the amplifiers, through the circuit 21, the secondary winding of the transformer 20 to ground 23, and thence to the grounded terminal 28 of the source 24. High frequency waves, corresponding to those supplied by the source 1, but in amplified form, will flow from the anodes 27c of the amplifier through the contacts 27b, water jackets 27a, leads 27, inductances 30, conductor 26, condenser 27A, tuned circuit, comprising the primary winding of the transformer 12 and parallel connected condenser, to ground 28 and back through ground 23 to the filaments of the amplifiers. These amplified waves will be impressed upon the antenna circuit including the secondary winding of the transformer 12, one terminal of which is connected to the antenna 13 and the other terminal to ground at 35.

The flow of oscillating impulses of undesired frequencies through the leads 27 to the common conductor 26 is prevented by the operation of the combined impedance device 29—30, while the high frequency current of desired frequency will traverse the low impedance path 30 shunting the resistance 29.

However, each pair of plates constituting the set described above is interconnected by paths, including the resistances 31 to 34, across which there is no difference of potential due to the energy of desired frequency. These paths offer relatively low impedance to oscillations of high frequencies and are in parallel with the high impedance paths each including the resistance 29 and shunting inductance 30. Undesired oscillations, being prevented from traversing the high impedance paths, will tend to flow through the low impedance paths including the resistances 31 to 34. The value of the resistances 31 to 34, included in the low impedance paths, is so chosen that the drop of potential between the pair of plates connected by each of these paths, because of the undesired oscillations, is insufficient to maintain their flow. As a result the undesired oscillations will be suppressed by, or their energy will be dissipated in, the resistances 31 to 34 inclusive. It will, therefore, be seen that the impedance devices 29—30 serve both to block and suppress undesired oscillations which tend to flow to the common bus bar. Any oscillations of undesired frequencies due solely to interaction between the devices will be forced to flow through the suppression paths including the resistances 31 to 34. In other words, the impedance units 29—30 are adapted to conduct currents of desired frequencies and also as a means for trapping currents of undesired frequencies, and the paths including the resistances 31 to 34 constitute additional suppression means.

Additional banks of amplifiers, similar to that described above and including means for suppressing undesired or parasitic oscillations, may be used by connecting their plate circuits to the conductors 36, their input circuits to the conductor 37 and to ground and their cathodes to conductors 38.

Figure 2:
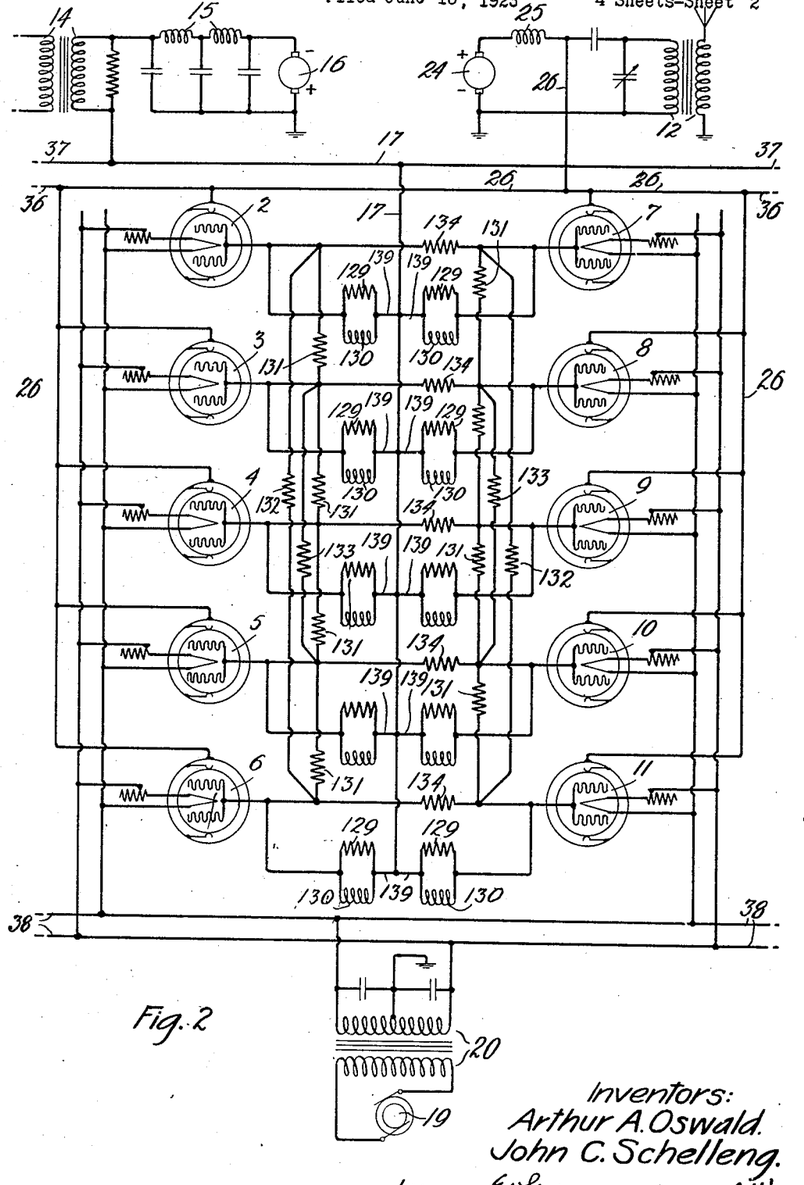
Fig. 2 shows a circuit similar to that of Fig. 1 but with the invention applied to the input circuits of the discharge devices.

Referring now to Fig. 2, there is shown an amplifying system in which the high frequency waves to be amplified are impressed on the input circuit of the amplifiers by the transformer 14. A polarizing source 16 is associated with the grid circuits through a filter 15. Heating current for the cathodes of the amplifiers is supplied by an alternating current source 19 through a transformer 20. Space current is supplied to the amplifiers by the source 24 through a choke coil 25 and conductor 26, and the output circuit of the amplifiers is connected to an antenna by the conductor 26 and transformer 12. Thus far this arrangement is identical with that described with reference to Fig. 1. In this arrangement, however, the parasitic oscillation suppressing means is included in the input circuit of the amplifiers.

The secondary winding of the input transformer 14, shunted by a resistance of such value relatively to the internal input impedance of the discharge devices that these devices repeat the high frequency waves impressed thereon, is connected by the conductor 17 to each of the grid or control electrodes of the amplifiers 2 to 11 by a lead 139 including in series therewith the parallel connected resistance 129 and inductance 130. The control electrodes of adjacent pairs of amplifiers in each row are connected by a path including a resistance 131. The control electrodes of the amplifiers 2 and 6, and 7 and 11, are interconnected by paths each including a resistance 132. The control electrodes of the amplifiers 3 and 5, and 8 and 10, are interconnected by paths each including a resistance 133. The control electrodes of the amplifiers 2 and 7, 3 and 8, 4 and 9, 5 and 10, 6 and 11, are connected by paths each including a resistance 134. As described with reference to the resistances 27 of Fig. 1, the resistances 129 offer high impedance to all high frequency currents, while the inductances 130 constitute low impedance paths, in shunt to the resistances 129, for the high frequency waves which are to be amplified. Moreover, the paths including the resistances 131, 132, 133 and 134 are of low impedance to high frequency currents and interconnect electrodes supplied with equal potentials, so that no current of the frequency to be amplified flows through the paths including them.

Free or parasitic oscillations developed in the system will be prevented from circulating through the leads connecting the control electrodes by the impedance units comprising the parallel connected resistances 129 and inductances 130, but those of the frequency to be amplified will flow through the paths provided by the inductances 130 which, as stated above, are designed to offer low impedance to currents of this frequency. Undesired oscillating impulses set up in the system tending to flow to the common bus bar 17 will be suppressed and those due to reaction between the devices will be diverted through the paths including the resistances 131, 132, 133 and 134. However since the voltage impressed across each of these paths is insufficient to maintain the flow of current therethrough, undesired oscillations, due to reaction between the devices, will be suppressed. An amplifying system comprising a plurality of banks, similar to that just described, may be provided by connecting the parallel connected output circuits of the different banks to conductors 36, their cathodes to conductors 38, and their common input circuits to conductor 37.

Figure 3:
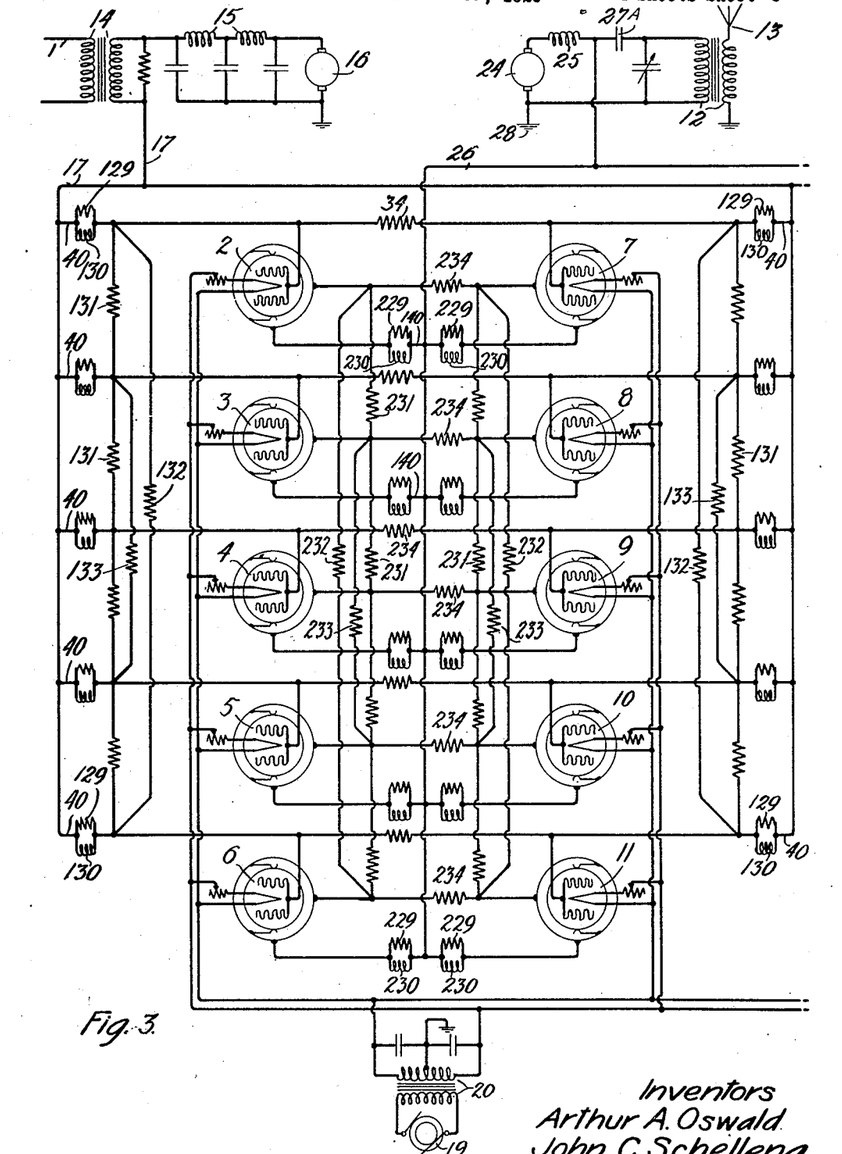
Fig. 3 is a circuit similar to that shown in Figs. 1 and 2 in which the invention is illustrated as applied to both the input and output circuits of a system including a number of electric discharge devices and Fig. 4 is an end view of a rack or frame for a system comprising a number of electric discharge devices embodying the invention.

Referring to Fig. 3, there is shown a radio transmitter including an amplifying system in which means for suppressing undesired or parasitic oscillations, similar to that used in the preceding figures, is associated with both the input and output circuits of the amplifiers.

This arrangement is similar to that shown in the preceding figures in that the high frequency waves to be amplified are impressed on the input circuit of the amplifying system through the transformer 14. Polarizing potential is supplied to the control electrodes of the amplifiers, through the filter 15, by the source 16. Alternating current for heating the cathodes is supplied thereto by the source 19 through the transformer 20. Space current is supplied to the amplifiers by the source 24, through the choke coil 25, and the amplified high frequency current is transmitted through the conductor 26, condenser 27A and transformer 12 to the antenna circuit 13.

In this arrangement, the secondary winding of the input transformer 14 is connected to the control electrodes of the amplifiers by leads 40 each having in series therewith parallel connected resistance 129 and inductance 130. Each pair of adjacent control electrodes are connected by a path including a resistance 131. The control electrodes of the amplifiers 2 and 6, and 7 and 11, are connected by paths each including a resistance 132. The control electrodes of the amplifiers 3 and 5, and 8 and 10, are connected by paths each including a resistance 133. The control electrodes of the amplifiers 2 and 7, 3 and 8, 4 and 9, 5 and 10, and 6 and 11, are connected by means of paths each including a resistance 134. Amplifier plate electrodes are connected to the common output conductor 26 by leads each including in series therewith a resistance 229, shunted by an inductance 230. The plate electrodes of adjacent amplifiers in each row are connected by a path including a resistance 231. The plates of the amplifiers 2 and 6, and 7 and 11, are interconnected by paths each including a resistance 232 and the plate electrodes of the amplifiers 3 and 5, and 8 and 10, are interconnected by paths each including a resistance 233. The plate electrodes of the amplifiers 2 and 7, 3 and 8, 4 and 9, 5 and 10, 6 and 11, are connected by paths each including a resistance 234. The resistances 129 and 229 offer high impedance to all high frequency currents while the inductances 130 and 230, respectively, connected in shunt of the resistances 129 and 229, are designed to offer low impedance to currents of the frequency to be amplified. The resistances 131 to 134 and 231 to 234, being each of the order of 100 ohms, are of low impedance for high frequency currents. However since there is substantially no potential difference between the electrodes interconnected by the 100 ohm paths, no high frequency current will flow between these electrodes.

The high frequency waves supplied through the circuit 1 will produce a fluctuating potential of the same frequency in the secondary winding of the transformer 14 which will be impressed upon the control electrodes of the amplifiers 2 to 10 through conductors 17, leads 40 and inductances 130. This fluctuating potential will cause the current, supplied by the source 24 through the inductance 25, conductor 26, leads 140 to the anodes and thence across the space between their anodes and cathodes, to fluctuate in accordance with the variable potential impressed upon the control electrodes. In this manner, waves of the desired high frequency, in amplified form, will be supplied from the anodes of the discharge devices through the leads 140, inductances 230, conductor 26, condenser 27A and transformer 12 to ground 28, thence to the ground connection 23, circuit 21 to the cathodes and across the space path to the anodes of the devices. The transformer 12 serves to impress the high frequency currents upon the antenna circuit 13.

Oscillating impulses of undesired frequencies produced in the system, which tend to flow through the leads 40, will be prevented from reaching the conductor 17 by the resistance 130 and will be suppressed by the resistance 129.

Undesired impulses, due to reaction between the devices, will tend to traverse the low impedance paths including the resistances 131, 132, 133 and 134 interconnecting the pairs of control electrodes. However, these resistances being of proper value and the potential across each of the paths including them being negligible, as described with reference to Fig. 2, the undesired impulses due to interaction between the devices will be suppressed by the resistances 131 to 134.

In a similar manner, undesired oscillations, which tend to flow in the output circuits of the amplifiers, will be prevented from reaching the conductor 26 by the coil 230 and will be suppressed by the resistance 229 included in each of the plate leads. Undesired oscillations, due to interaction between the devices, will tend to flow through the low impedance paths including the resistances 231, 232, 233 and 234. However, since the same potential is supplied to the anodes and there is substantially no difference of potential impressed across these paths, as described with reference to Fig. 1, the parasitic oscillations will be suppressed by the resistances 231 to 234.

Figure 4:
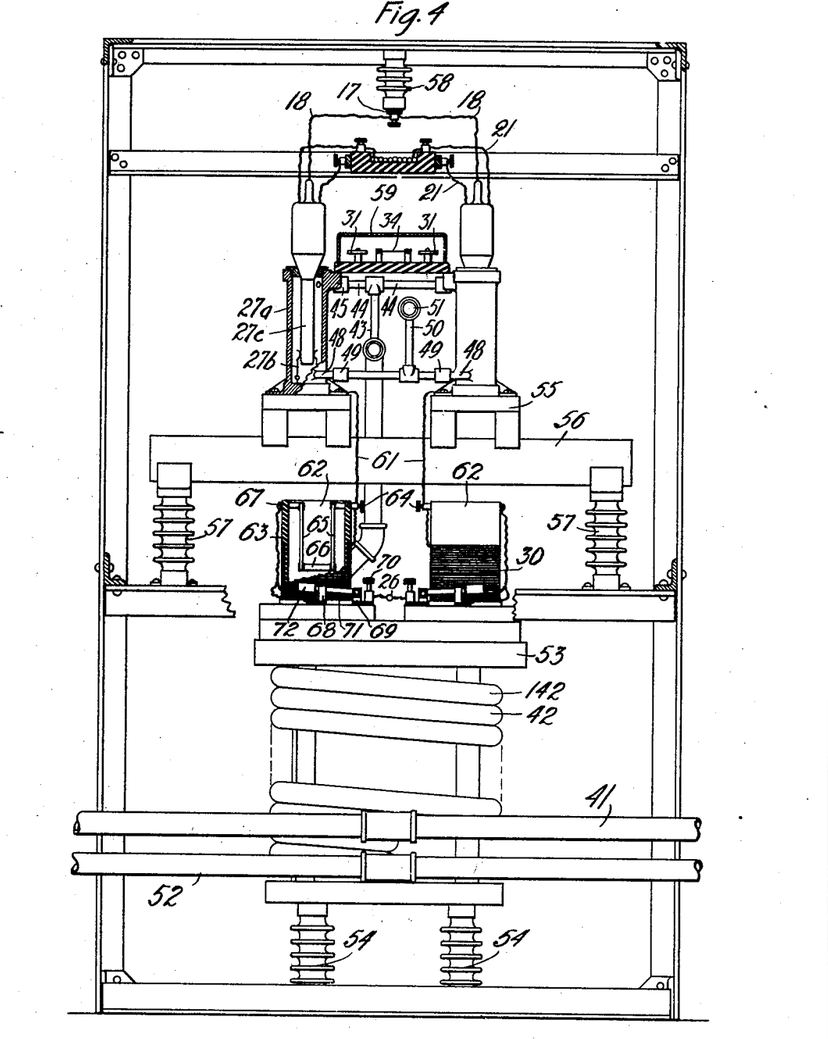

Referring to Fig. 4 there is shown an end view of a panel upon which a bank of high potential high voltage amplifiers may be mounted. The amplifiers illustrated are of the water-cooled type having external anodes adapted to be inserted in a chamber through which may be caused to circulate water, or other cooling medium, supplied from any suitable source, such as, for example, an ordinary city water main. Pipe 41, leading from the city water supply system or any other suitable source, is connected by an insulating conduit 42, such as a rubber hose, to a pipe 43. Branch pipes 44, each including an insulating sleeve 45, connects pipe 43 to chambers 27a in each of which the anode 27c of an amplifier is enclosed. The water circulating through the chamber 27a is discharged through branch pipes 48, each including an insulating sleeve 49, and the pipe 50 to a pipe 51 connected by means of a flexible insulating conduit 142 to the pipe 52 which may be connected to a city sewer main. The flexible conduits 42 and 142 are wound on a spool 53 which is adapted to be supported on the panel structure by high tension insulators 54. The amplifiers are mounted on base plates 55 secured to frames 56 which in turn are secured to the supporting frame by high tension insulators 57.

The conductors 21 supply heating current to the cathodes of the amplifiers. Leads 18 serve to connect the control elements of the amplifiers to the input conductors 17 which are secured to the supporting frame by a high tension insulator 58. Secured to the water jackets 27a for the anodes of the amplifiers is a box 59, herein shown in section, in which the resistances 31, 32, 33 and 34 are adapted to be mounted. It is intended that the parasitic oscillation suppressing means be included in the plate circuits of the amplifiers, and hence the resistances enclosed in the box 59 will be connected in suppression paths interconnecting the anodes of the amplifiers. The amplifier anodes are electrically connected by the spring contact conductors 27b to the casings 27a, which are connected by the conductors 61 to the units 62, one for each amplifier. The units 62 are in turn connected to the plate conductor or bus-bar 26.

Each unit 62 comprises a pair of resistances 65 enclosed in an insulating cylinder 63 having a binding post 64 to which the conductor 61 is connected. The binding post 64 is connected to a short conductive rod extending inwardly of the cylinder to which is connected the upper end of one of the resistances 65. The rod 64 serves to mechanically support the resistance 65 and also to electrically connect it to the binding post 64. The lower ends of the pair of resistances 65 are held in spaced relation and electrically connected in series by a connecting rod 66. The upper end of the second resistance 65 is connected through a supporting conductive rod to the binding post 67. These two series connected resistances constitute the high impedance element indicated in Figs. 1, 2 and 3, respectively, by the reference numerals 29, 129 and 229. The external diameter of the lower portion of the cylinder 63 is reduced, and the inductance coil is wound upon this reduced portion. One terminal of this coil, which constitutes the inductance indicated in Figs. 1, 2 and 3, by the reference numerals 30, 130 and 230, respectively, is connected to the binding post 64, while its other terminal and the binding post 67 are connected together and to one contact 68 of a knife switch. The other contact 69 of the switch is connected to a binding post 70 adapted to be connected to the conductor 26. The movable switch blade 71, provided with a handle 72, is pivoted to the contact 69 and is adapted to engage the contact 68, whereby the anode of each amplifier may be separately connected to the common bus-bar 26.

The amplifying system described above is well adapted for use in any system where low power alternating wave energy is to be amplified to produce high power high potential energy of the same wave form.

A high power radio transmitter including two amplifier banks, each consisting of ten tubes connected to the transmitting antenna, has been used to supply energy of upwards of 150 kilowatts to an antenna circuit. The plate potential employed was of the order of 10,000 volts and the frequency of the waves radiated was about 55,000 cycles. A normal polarizing potential of between 250 and 300 volts was applied to the control electrodes of the amplifiers. Associated with each bank of amplifiers was a network for suppressing undesired oscillations in which blocking resistances 29 (229) were of the order of 1200 ohms. The inductances 30 (230) in shunt to the 1200 ohms resistance elements were .1 millihenry and the resistances included in the paths interconnecting the electrodes, that is, the resistances 31 to 34 (231 to 234) were 100 ohms. In the operation of this arrangement, it was found possible to amplify a modulated carrier wave of the order of 55,000 to 58,000 cycles without interference by parasitic or undesired oscillations.

From the preceding description, it will be seen that this invention is adapted to provide an arrangement whereby systems including electric discharge devices may be used to supply an enormous amount of power at high voltage to a load circuit and are, therefore, well adapted for radio telephonic communication over long distances. Obviously, the essential principles of this invention may be used in association with any system including electric discharge devices adapted to supply high power high potential energy to a load circuit and hence the invention may be applied to discharge devices operating as oscillators or modulators.

Certain arrangements and specific details have been described above with the sole object of clearly and completely describing the nature of this invention. However, as stated above, this invention is of general application and is not to be limited to these arrangements or details, nor by the theory of operation set forth, but only by the scope of the appended claims.

What is claimed is:

1. In a space discharge system including a plurality of parallel connected units each comprising one or more tubes, the method of preventing the production of undesired oscillations in the system which comprises causing waves of desired frequency to traverse a low impedance path therefor, and causing said undesired oscillations to traverse a different impedance path.

2. In a system comprising a plurality of space discharge units connected in parallel to a common output circuit, the method of preventing the production of undesired oscillations in the system which comprises causing oscillations of desired frequency to traverse a low impedance path therefor and excluding oscillations of undesired frequency from said path by diverting and suppressing said undesired oscillations.

3. In a space discharge system including a plurality of parallel connected space discharge units, the method of preventing the production of undesired oscillations in the system which comprises causing oscillations of desired frequency to traverse a low impedance path therefor while excluding oscillations of undesired frequencies therefrom, and dissipating the undesired oscillations by causing them to traverse a conductive path in parallel with said first mentioned path.

4. In a system including a plurality of parallel connected space discharge units, the method of preventing production of undesired oscillations in the system which comprises causing oscillations of desired frequency from the respective units to traverse parallel conductive paths while diverting undesired oscillations from said paths, and suppressing said undesired oscillations.

5. In a system consisting of a number of electric discharge devices having circuits connecting their corresponding electrodes in parallel and including separate conductive paths for oscillations of different frequencies, the method of preventing the production of parasitic oscillations which comprises causing oscillations of desired frequency to flow through one of the conductive paths while excluding parasitic impulses therefrom and suppressing the parasitic impulses in the associated conductive paths.

6. In a system consisting of a number of electric discharge devices having circuits connecting their corresponding electrodes in parallel and including separate conductive paths for oscillations of different frequencies, the method of preventing the production of undesired oscillations which comprises causing oscillation of desired frequency to flow through one of the conductive paths while excluding undesired oscillations therefrom and suppressing the undesired oscillations in the other path.

7. In a system consisting of a number of electric discharge devices having circuits connecting their corresponding electrodes in parallel and including separate conductive paths for oscillations of different frequencies, the method of preventing the production of undesired oscillations which comprises causing oscillations of desired frequency to flow through one of the conductive paths while excluding undesired oscillatory impulses therefrom, diverting the undesired impulses through the other associated conductive paths and limiting the electromotive force impressed across the said last-mentioned paths so that the energy of said impulses is dissipated.

8. In a system consisting of a plurality of electric discharge devices having their electrode circuits connected in parallel and including separate conductive paths for oscillations of different frequencies the method of preventing the production of undesired oscillations which comprises causing desired oscillations to flow through one of said paths while excluding undesired oscillations therefrom, suppressing undesired oscillations tending to traverse this path, diverting other undesired oscillations through other paths and suppressing said other undesired oscillations.

9. In a system comprising a number of electric discharge devices having circuits connecting their corresponding electrodes in parallel, means associated with one of said circuits constituting a path of low impedance for oscillations of desired frequencies and a path of high impedance for impulses of undesired frequencies, and other means associated with said circuits which is of low impedance for the undesired frequency impulses and is adapted to dissipate the energy of said impulses.

10. In a system comprising a number of electric discharge devices having circuit connecting their corresponding electrodes in parallel, means associated with one of said circuits constituting a path of low impedance for oscillations of desired frequencies and a path of high impedance for impulses of undesired frequencies, other means associated with said circuit which is of low impedance for the undesired frequency impulses, and means for limiting the electromotive force impressed across said low impedance means whereby the energy of said impulses is dissipated therein.

11. In a system comprising a number of electric discharge devices having circuits connecting their corresponding electrodes in parallel, means associated with one of said circuits constituting separate paths, one of which is of low impedance for oscillations of desired frequencies but of high impedance for oscillations of undesired frequencies and includes means for suppressing undesired oscillations, while the others are of low impedance for other undesired oscillations and include means for suppressing said other undesired oscillations.

12. In a system comprising a number of electric discharge devices having circuits connecting their corresponding electrodes in parallel, means associated with one of said circuits for blocking and suppressing undesired oscillations but of low impedance for desired oscillations, and means of low impedance for other undesired oscillations including means for suppressing said other oscillations.

13. In a system comprising a number of electric discharge devices having grid and plate circuits respectively connected in parallel, means associated with said plate circuits constituting a path of low impedance for oscillations of desired frequencies and a path of high impedance for undesired frequency impulses, and other means associated with said circuit which is of low impedance for the undesired frequency impulses and is adapted to dissipate the energy of said impulses.

14. In a system comprising a number of electric discharge devices having grid and plate circuits respectively connected in parallel, means associated with said plate circuits constituting a path of low impedance for oscillations of desired frequencies and a path of high impedance for undesired frequency impulses, and means included in said last-mentioned path for dissipating the energy of said impulses.

15. In a system comprising a number of electric discharge devices connected in parallel and having grid and plate circuits, means for supplying current to be amplified to the grid circuit, means for deriving amplified currents from the plate circuit, and an impedance network associated with one of said circuits adapted to provide a low impedance path for said amplified currents and at the same time a high impedance path for impulses of undesired frequencies, and a second path of low impedance for the undesired impulses.

16. In a system comprising a number of electric discharge devices connected in parallel and having grid and plate circuits, means for supply currents to be amplified to the grid circuit, means for deriving amplified currents from the plate circuit, an impedance network associated with one of said circuits adapted to provide a low impedance path for said amplified currents and at the same time a high impedance path for impulses of undesired frequencies and a second path of low impedance for the undesired impulses, and means included in said last-mentioned path for dissipating the energy of said undesired impulses.

17. In an amplifying system, the combination of a number of amplifiers connected in parallel having grid and plate circuits, means for supplying current to be amplified to said grid circuits, a common output conductor, connections for supplying amplified current to said conductor from the plate of each of said amplifiers, said connections being of low impedance for the amplified current but of high impedance for current impulses of undesired frequencies, and alternating current conductive paths of low impedance for current impulses of undesired frequencies interconnecting the plates of said amplifiers.

18. In an amplifier system the combination of a number of amplifiers connected in parallel having grid and plate circuits, means for supplying current to be amplified to said grid circuits, a common output conductor, connections for supplying amplified current to said conductor including an element which is of high impedance for high frequency alternating current shunted by an element of low impedance for amplified currents of desired frequency which is also of high impedance for alternating current impulses of undesired frequencies, and alternating current conductive paths of low impedance for impulses of undesired frequencies interconnecting the plate circuits of said amplifiers.

19. An alternating current system comprising a number of electric discharge devices having their respective electrodes connected in parallel, one corresponding set of said electrodes being connected to a common busbar by leads provided with means for conducting currents of desired frequencies, and for blocking currents of other frequencies, and suppressing paths for said other frequencies associated with said set of electrodes.

20. In a system comprising a number of electric discharge devices having circuits connecting their corresponding electrodes in parallel, means associated with each of said circuits for suppressing undesired oscillations and each including a path of low impedance for oscillations of desired frequency but of high impedance for undesired oscillations and a path of low impedance for undesired oscillations including means for suppressing said undesired oscillations, and paths of low impedance for other undesired oscillations including means for suppressing said other oscillations.

21. In a system comprising a number of electric discharge devices having circuits connecting their grids and plates in parallel, a network associated with the grid circuit, a network associated with the plate circuit, each network including a path of low impedance for oscillations of desired frequencies, which is of high impedance for undesired oscillations, and a path of low impedance for undesired oscillations including means for dissipating the energy of said undesired oscillations.

22. In a system comprising a number of electric discharge devices having circuits connecting their grids and plates in parallel, a network associated with the grid circuit, a network associated with the plate circuit, each network including a path of low impedance for desired oscillations which is of high impedance for undesired oscillations, means associated with said path for suppressing undesired oscillations, and a path of low impedance for other undesired oscillations including means for suppressing said other oscillations.

23. A space discharge system comprising a plurality of units and means connecting said units in parallel relation to an external circuit, said means consisting of a low impedance path for desired oscillations and at least one other path conductive for undesired oscillations in which said undesired oscillations are suppressed.

24. A space discharge system comprising a plurality of space discharge units, means consisting of a path of low impedance for waves of desired frequency and other impedance for waves of undesired frequencies for connecting said units in parallel relation with respect to an external circuit and to control the suppression of said undesired waves.

25. A space discharge system comprising a plurality of space discharge units, means consisting of a low impedance path for desired oscillations and a high impedance for undesired oscillations for connecting said units in parallel relation with respect to an external circuit and to control the suppression of undesired oscillations.

26. A space discharge system comprising a plurality of space discharge units, means for connecting said units in parallel relation with respect to an external circuit, said means comprising a path of low impedance for oscillations of desired frequency but of high impedance for undesired oscillations, and a means for suppressing said undesired oscillations associated with said connecting means.

27. A space discharge system comprising a plurality of space discharge units, means for connecting said units in parallel relation with respect to an external circuit, said means comprising a path of low impedance for oscillations of desired frequency but of high impedance for undesired oscillations and means in parallel with said connecting means for suppressing said desired oscillations.

28. A system comprising a plurality of units, each including at least one space discharge device, said units being connected in parallel, an input circuit and an output circuit therefor, and a network, supplementary to said circuits, including resistive paths between one unit and each other unit whereby the generation of spurious oscillations is prevented.

29. A system comprising a plurality of units, each unit including at least one space discharge device having an anode, and a control electrode, and paths connecting certain of the corresponding electrodes of said devices, said paths including inductance and resistance elements in parallel.

30. In a system in accordance with claim 29, additional resistances connecting corresponding electrodes of certain of said devices.

31. In a system comprising a number of space discharge units connected in parallel relation, a bus-bar conductor to which corresponding electrodes of said devices are connected by leads each of which includes a resistance and inductance element in parallel.

In witness whereof, I hereunto subscribe my name this 17th day of May, 1923.
JOHN C. SCHELLENG.

In witness whereof, I hereunto subscribe my name this 27th day of April, 1923.
ARTHUR A. OSWALD.